C. G. STRANDLUND.
WHEELED PLOW.
APPLICATION FILED JULY 31, 1915.
1,262,995.
Patented Apr. 16, 1918.
2 SHEETS—SHEET 1.
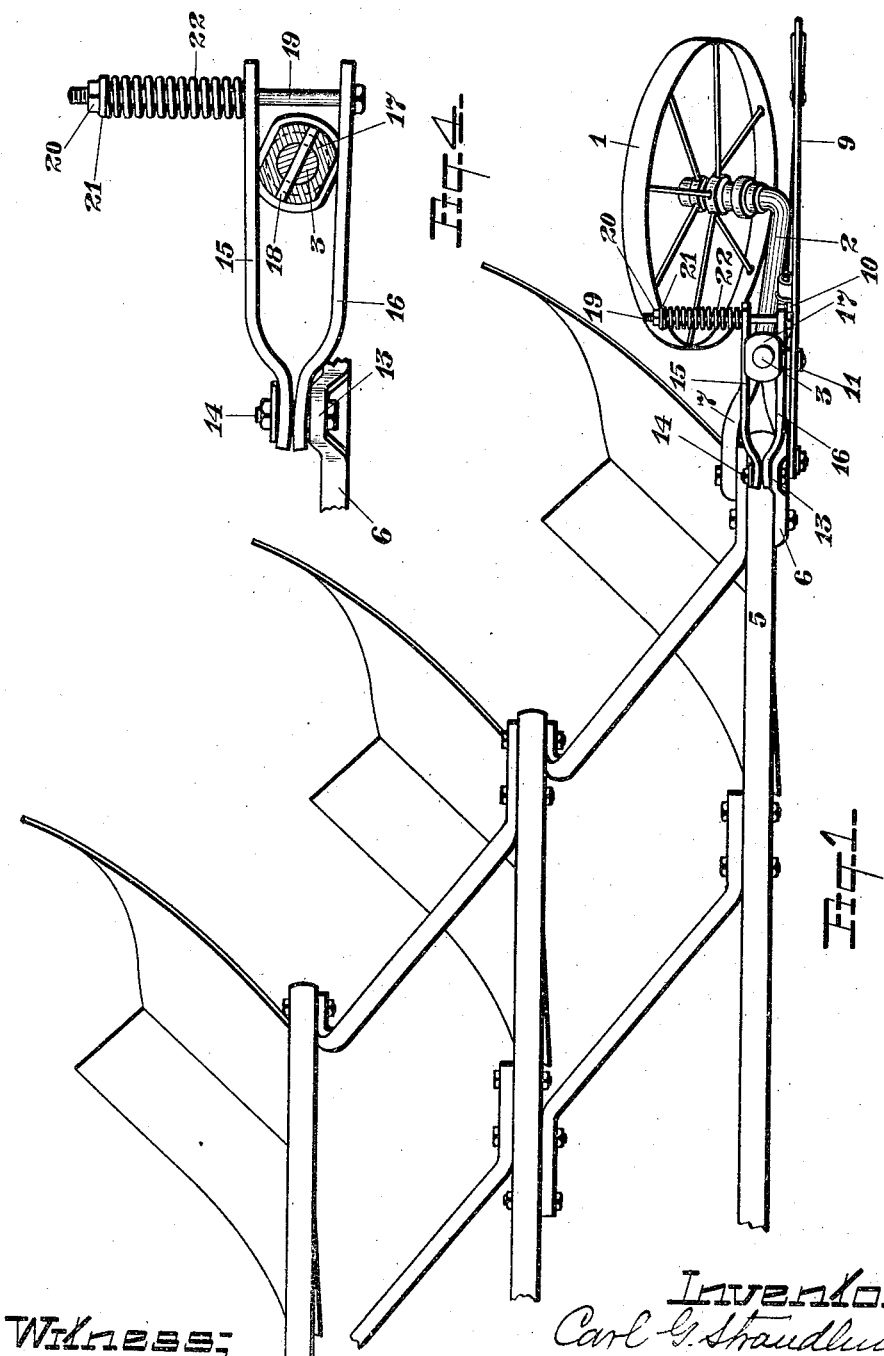

C. G. STRANDLUND.
WHEELED PLOW.
APPLICATION FILED JULY 31, 1915.
1,262,995.
Patented Apr. 16, 1918.
2 SHEETS—SHEET 2.
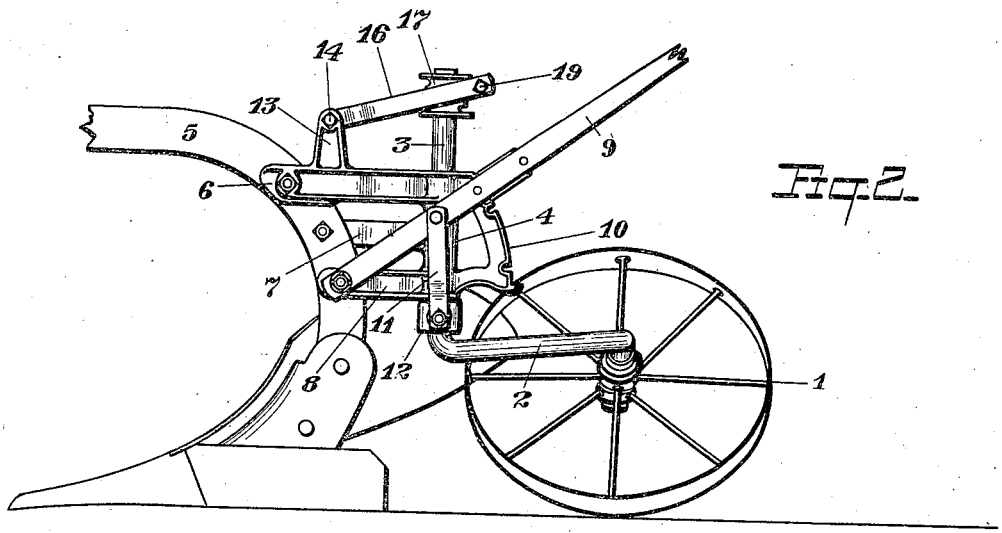
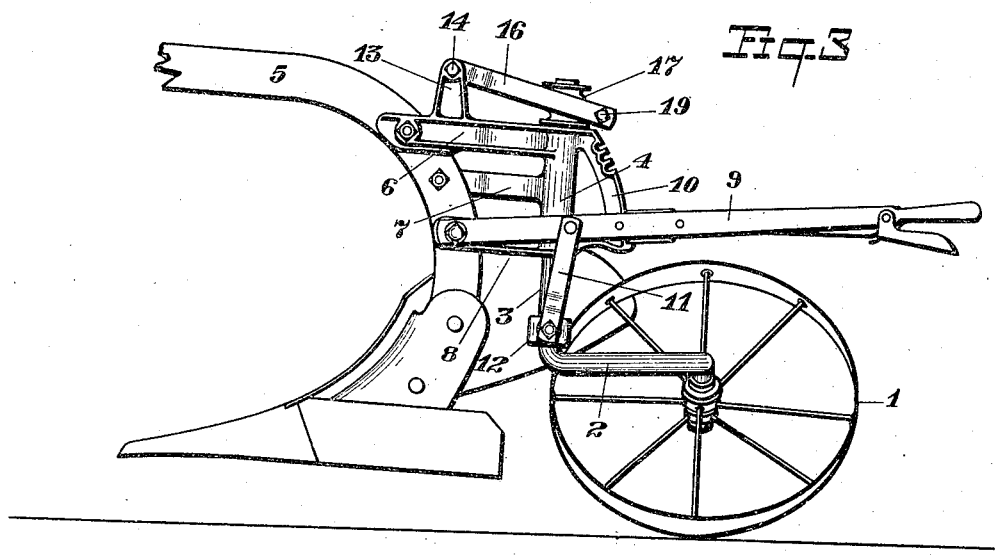

UNITED STATES PATENT OFFICE.

CARL G. STRANDLUND, OF MOLINE, ILLINOIS, ASSIGNOR TO DEERE AND COMPANY, OF MOLINE, ILLINOIS, A CORPORATION OF ILLINOIS.

WHEELED PLOW.

1,262,995.  Specification of Letters Patent.  Patented Apr. 16, 1918.

Application filed July 31, 1915. Serial No. 42,922.

*To all whom it may concern:*

Be it known that I, CARL G. STRANDLUND, a citizen of the United States, residing at Moline, in the county of Rock Island and State of Illinois, have invented certain new and useful Improvements in Wheeled Plows, of which the following is a specification, reference being had therein to the accompanying drawing.

My invention relates to wheeled plows, having front and rear caster wheels, and particularly to the means employed to secure the rear caster wheel to the plow, and to adjust it to varying positions.

An object of my invention is to provide a simple and effective device, which can be readily operated to raise the rear end of a wheeled plow from the ground.

A further object of my invention is to provide a means for holding the wheel to travel in a line parallel with the furrows, said holding means being adapted to yield to permit the wheel to follow the plow when the latter is making a turn.

Referring to the drawings in which similar numerals indicate identical parts—

Figure 1 is a plan view of the rear end of a gang plow showing my improved means of mounting a caster wheel thereon.

Fig. 2 is a side elevation with the plow lowered.

Fig. 3 is a similar view to Fig. 2 with the plow raised, and

Fig. 4 is a detail.

The caster wheel 1 is mounted on a crank axle 2 having a vertical portion forming a spindle 3 which is journaled in a bearing 4; the bearing 4 is mounted on the rear end of the landward plow beam 5 by arms 6, 7 and 8 which are preferably integral with the bearing 4 and which are bolted to the plow beam 5. A hand lever 9 is pivoted on the arm 8, preferably by the same bolt that secures the latter to plow beam 5, and is journaled with the usual form of latch adapted to engage with notches in an arc 10, on the bearing 5, and concentric with the lever pivot. A link 11 extends downwardly from the lever 9, to which it is pivotally connected, and is pivotally attached to a collar 12 loosely mounted on the lower portion of the spindle 3.

On the arm 6, and preferably integral therewith, is a standard 13 having pivotally supported thereon, by a bolt 14, bars 15 and 16; the bars 15 and 16 extend rearwardly on opposite sides of a sleeve 17 which is rigidly secured on the upper end of the spindle 3 by a pin 18 and are retained in position against the sleeve 17 by flanges $a$ and $b$ on the upper and lower ends of the sleeve 17 respectively.

A headed bolt 19 extends through the bars 15 and 16 near their rear ends, and has on its threaded extremity a nut 20 and a washer 21; between the washer 21 and the bar 15 a coiled spring 22 is mounted on the bolt 19 and exerts its force to hold the bars 15 and 16 in close contact with opposite flattened sides of the sleeve 17 when the wheel 1 is traveling in a line substantially parallel with the furrow, so that the pressure of the spring 22 tends to steady the wheel 1 when the plow is operating or traveling in a direct line; when the plow however is making a turn, as for instance to the left, the spindle 3 will be rotated to the right, consequently the wheel 1 will be moved to travel in that direction. As the smaller diameter of the sleeve 17 is between the flattened sides it follows that as the latter rotates simultaneously with the spindle 3, acts to spread apart the bars 15 and 16 and to compress the spring 22 so the force of the spring 22 is applied, as the plow again assumes a direct line of travel, to return the wheel to its original position.

In Fig. 2 the plow is shown down and ready for plowing and in order to raise it I operate the lever 9, the latter, having its fulcrum at its pivotal connection with the link 11 and pivotally secured to the arm 8 and beam 5, when it is moved downward raises the plow from the ground to the desired height where it can be held by the latch on the lever engaging with one of the notches in the arc 10; a reverse movement of the lever will lower the plow as will be readily understood, the bearing 4 moving freely on the spindle 3.

It will be at once apparent the plow can be raised quickly and readily whether it is moving straight ahead or turning, and regardless of the position of the wheel 1 in relation thereto.

What I claim is—

1. In a wheeled plow, a crank axle having a vertical spindle journaled to oscillate in a bearing on the plow, a wheel mounted on the crank axle to travel normally in a direction substantially parallel with the line of work of the plow, and resilient means operating against flattened surfaces on opposite sides of said spindle and exerting lateral pressure to hold said spindle against rotation, said means adapted to yield to permit the wheel to follow the plow in making a turn and to exert its pressure to return said wheel to its normal position when the plow is again operating in a straight line.

2. In a wheeled plow, a crank axle having a vertical spindle journaled to oscillate in a bearing on the plow, a wheel mounted on the crank axle to travel normally in a direction substantially parallel with the line of work of the plow, a sleeve rigidly mounted on said spindle and having opposite flattened sides, and resilient means exerting pressure against the sides to hold said spindle stationary, said means adapted to yield to permit the wheel to follow the plow in making a turn and to exert its pressure to return the wheel to its normal position when the plow is again operating in a straight line.

3. In a wheeled plow, a crank axle having a vertical spindle journaled to oscillate in a bearing on the plow, a wheel mounted on the crank axle to travel normally in a direction substantially parallel with the line of work of the plow, a sleeve rigidly mounted on said spindle and having opposite flattened sides, and resilient means exerting pressure against the sides to hold said spindle stationary.

4. In a wheeled plow, a crank axle having a vertical spindle journaled to oscillate in a bearing on the plow, a wheel mounted on the crank axle to travel normally in a direction substantially parallel with the line of work of the plow, a sleeve rigidly mounted on said spindle and having opposite flattened sides, arms pivotally supported on the plow and extending rearwardly of the sleeve, and a spring adapted to hold said arms in yielding contact with the flattened sides of the sleeve.

5. In a wheeled plow, a crank axle having a vertical spindle journaled to oscillate in a bearing on the plow, a wheel mounted on the crank axle to travel normally in a direction substantially parallel with the line of work of the plow, a sleeve rigidly mounted on said spindle and having opposite flattened sides, arms pivotally supported on the plow and extending rearwardly, and a spring adapted to hold said arms in contact with the flattened sides of the sleeve.

6. In a wheeled plow, a crank axle having a vertical spindle journaled to oscillate in a bearing on the plow, a wheel mounted on the crank axle to travel normally in a direction substantially parallel with the line of work of the plow, a sleeve rigidly mounted on said spindle and having opposite flattened sides, arms pivotally supported on the plow, a bolt projecting loosely through both arms and a coiled spring secured on the bolt, and adapted to hold both arms in contact with the sleeve.

7. In a wheeled plow, a crank axle having a vertical spindle journaled to oscillate in a bearing on the plow, a wheel mounted on the crank axle to travel normally in a direction substantially parallel with the line of work of the plow, a sleeve rigidly mounted on said spindle and having opposite flattened sides, arms pivotally supported on the plow and extending rearwardly of the sleeve, a bolt projecting loosely through both arms adjacent the rear ends thereof, and a coiled spring secured on the bolt and exerting its tension to hold both arms in contact with the flattened sides of the sleeve.

8. In a wheeled plow, a bearing supported on arms secured to the plow beam, a crank axle having a vertical spindle journaled to oscillate in said bearing, a wheel mounted on the crank axle to travel normally in a direction substantially parallel with the line of work of the plow, a sleeve rigidly mounted on said spindle and having opposite flattened sides, a standard on a bearing supporting arm, arms pivoted on said standard and projecting rearwardly on opposite sides of said sleeve, a bolt projecting loosely through both of said arms adjacent their rear ends, and a coiled spring secured on the bolt and exerting its tension to hold both arms in contact with the flattened sides of the sleeve.

In testimony whereof I affix my signature, in presence of two witnesses.

CARL G. STRANDLUND.

Witnesses:
JESSIE SIMSER,
MARTIN PETERSON.

Copies of this patent may be obtained for five cents each, by addressing the "Commissioner of Patents, Washington, D. C."